United States Patent
Hioki

(10) Patent No.: US 11,958,304 B2
(45) Date of Patent: Apr. 16, 2024

(54) INK-JET TEXTILE PRINTING PRETREATMENT LIQUID, INK SET, INK-JET TEXTILE PRINTING APPARATUS, AND INK-JET TEXTILE PRINTING METHOD

(71) Applicant: KYOCERA Document Solutions Inc., Osaka (JP)

(72) Inventor: Jun Hioki, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/628,625

(22) PCT Filed: Mar. 18, 2021

(86) PCT No.: PCT/JP2021/010969
§ 371 (c)(1),
(2) Date: Jan. 20, 2022

(87) PCT Pub. No.: WO2021/193322
PCT Pub. Date: Sep. 30, 2021

(65) Prior Publication Data
US 2023/0339236 A1    Oct. 26, 2023

(30) Foreign Application Priority Data

Mar. 25, 2020  (JP) ................. 2020-054345

(51) Int. Cl.
| | | |
|---|---|---|
| B41J 3/407 | (2006.01) |
| B41J 2/21 | (2006.01) |
| B41J 11/00 | (2006.01) |
| C09D 5/30 | (2006.01) |
| C09D 11/54 | (2014.01) |
| D06P 5/30 | (2006.01) |

(52) U.S. Cl.
CPC ............ *B41J 3/4078* (2013.01); *B41J 2/211* (2013.01); *B41J 11/0015* (2013.01); *C09D 11/54* (2013.01); *D06P 5/30* (2013.01)

(58) Field of Classification Search
CPC ...... B41J 3/4078; B41J 2/211; B41J 11/0015; C09D 11/54; D06P 5/30
See application file for complete search history.

(56) References Cited

U.S. PATENT DOCUMENTS

| | | | |
|---|---|---|---|
| 10,183,502 B2 | 1/2019 | Yatake | |
| 2010/0079516 A1* | 4/2010 | Nakazawa | ............... B41J 2/175 347/7 |
| 2019/0301085 A1* | 10/2019 | Ito | ........................ C09D 11/102 |

FOREIGN PATENT DOCUMENTS

| | | |
|---|---|---|
| JP | H08-52868 | 2/1996 |
| JP | 2011-168912 | 9/2011 |

(Continued)

OTHER PUBLICATIONS

JPO, Office Action of JP 2022-510019 dated Jan. 17, 2023.
JPO, Office Action of JP 2022-510019 dated Jun. 13, 2023.

*Primary Examiner* — Jason S Uhlenhake
(74) *Attorney, Agent, or Firm* — LEX IP MEISTER, PLLC

(57) ABSTRACT

An ink-jet textile printing pretreatment liquid is discharged by an ink-jet nozzle, and contains a specific solvent and a specific resin particle. The specific solvent contains water and polyvalent alcohol. The specific resin particle contains a cationic resin having a cationic group. A particle size of the specific resin particle is 30 nm or more and 150 nm or less.

11 Claims, 1 Drawing Sheet

(56) References Cited

FOREIGN PATENT DOCUMENTS

| JP | 2011-168913 | 9/2011 |
| JP | 2019-178469 | 10/2019 |
| JP | 2019-178470 | 10/2019 |

\* cited by examiner

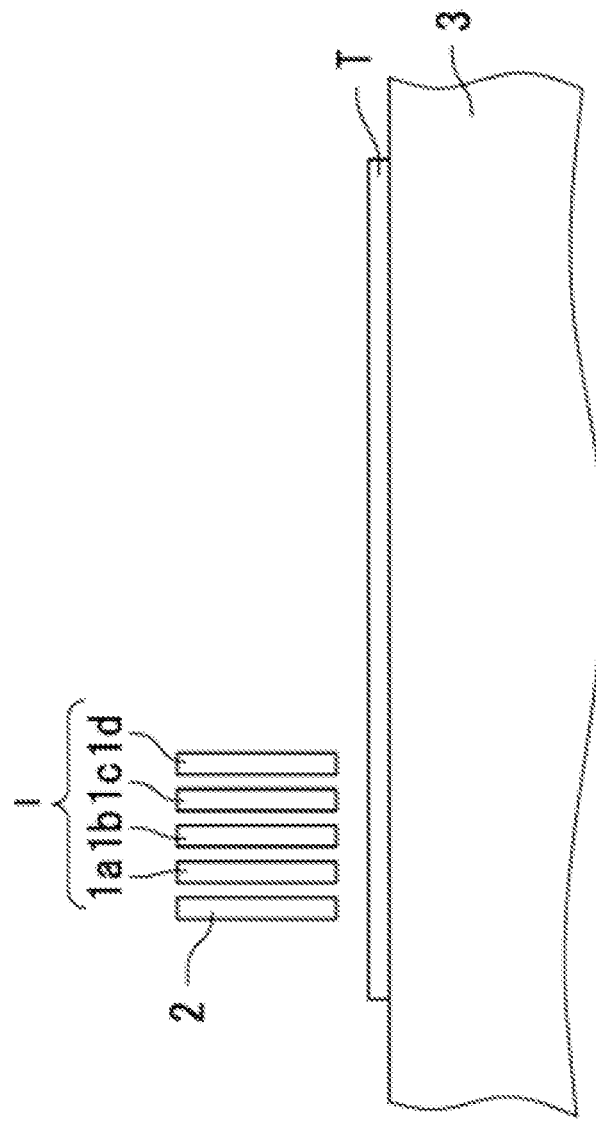

INK-JET TEXTILE PRINTING PRETREATMENT LIQUID, INK SET, INK-JET TEXTILE PRINTING APPARATUS, AND INK-JET TEXTILE PRINTING METHOD

TECHNICAL FIELD

The present invention relates to an ink-jet textile printing pretreatment liquid, an ink set, an ink-jet textile printing apparatus, and an ink-jet textile printing method.

BACKGROUND ART

In an ink-jet textile printing method, it is required to be able to form a textile printed matter with excellent color development, while suppressing occurrence of the bleeding and deterioration of the tactile sensation. In response to such a requirement, an ink-jet textile printing method using a pretreatment liquid has been proposed (e.g., Patent Literature 1).

CITATION LIST

Patent Literature

Patent Literature 1: Japanese Unexamined Patent Application Publication No. H8-52868

SUMMARY OF THE INVENTION

Problems to be Solved by the Invention

However, even with the ink-jet textile printing method described in Patent Literature 1, it is difficult to form a textile printed matter with excellent color development, while suppressing occurrence of the bleeding and deterioration of the tactile sensation.

The present invention has been made in view of the above-stated problem, and an objective thereof is to provide an ink-jet textile printing pretreatment liquid, an ink set, an ink-jet textile printing apparatus, and an ink-jet textile printing method, with which it is possible to form a textile printed matter with excellent color development, while suppressing occurrence of the bleeding and deterioration of the tactile sensation.

Means for Solving the Problem

An ink-jet textile printing pretreatment liquid according to the present invention is an ink-jet textile printing pretreatment liquid discharged with an ink-jet nozzle, and contains a specific solvent and a specific resin particle. The specific solvent contains water and polyvalent alcohol. The specific resin particle includes a cationic resin having a cationic group. Particle size of the specific resin particles is 30 nm or more and 150 nm or less.

An ink set according to the present invention includes an ink-jet textile printing ink and the above ink-jet textile printing pretreatment liquid. The ink-jet textile printing ink contains a pigment, a binder resin particle, a water-soluble organic solvent, and water.

An ink-jet textile printing method according to the present invention is an ink-jet textile printing method that forms an image in an image-forming area of a textile print target by using the above ink set, and includes a pretreatment process that discharges, by an ink-jetting, the ink-jet textile printing pretreatment liquid to the image-forming area, and an image-forming process that discharges, by an ink-jetting, the ink-jet textile printing ink to the image-forming area.

An ink-jet textile printing apparatus of the present invention is an ink-jet textile printing apparatus that forms an image in an image-forming area of a textile print target by using the above ink set, and includes a pretreatment portion that discharges, by an ink-jetting, the ink-jet textile printing pretreatment liquid to the image-forming area, and an image-forming portion that discharges, by an ink-jetting, the ink-jet textile printing ink to the image-forming area.

Effect of the Invention

According to the ink-jet textile printing pretreatment liquid, the ink set, the ink-jet textile printing apparatus, and the ink-jet textile printing method, it is possible to form a textile printed matter with excellent color development, while suppressing occurrence of the bleeding and deterioration of the tactile sensation.

BRIEF DESCRIPTION OF THE DRAWINGS

FIG. 1 is a side view showing an example of an ink-jet textile printing apparatus.

MODE FOR CARRYING OUT THE INVENTION

The following describes embodiments of the present invention. In the following, unless otherwise specified, the measured value of the particle size is the cumulant average particle size measured by the cumulant method, by using a dynamic light scattering type particle size distribution measuring apparats ("Zetasizer Nano ZS" made by Sysmex Corporation). Unless otherwise specified, the measured value of the volume median diameter (D50) is the value measured using the dynamic light scattering type particle size distribution measuring apparats ("Zetasizer Nano ZS" made by Sysmex Corporation).

In the present specification, acrylics and methacryls may be collectively referred to as "(meth)acrylics". Each component described in the present specification may be used alone or in combination of two or more.

First Embodiment: Ink-Jet Textile Printing Pretreatment Liquid

Hereinafter, the ink-jet textile printing pretreatment liquid according to a first embodiment of the present invention (hereinafter, may be simply referred to as a pretreatment liquid) will be described. The pretreatment liquid of the present invention is a pretreatment liquid to be discharged with an ink-jet nozzle, and contains a specific solvent and a specific resin particle. The specific solvent includes water and polyvalent alcohol. The specific resin particle includes a cationic resin having a cationic group. The particle size of the specific resin particle is 30 nm or more and 150 nm or less.

The pretreatment liquid of the present invention, by being provided with the above structure, can form a textile printed matter with excellent color development, while suppressing occurrence of bleeding and deterioration of tactile sensation. The reason therefor is presumed to be as follows. The pretreatment liquid of the present invention contains the specific resin particle containing the cationic resin. Here, a general ink used for the ink-jet textile printing contains an ink component having an anionic property (for example, a pigment having an anionic property and a binder resin particle having an anionic property). Therefore, when the ink is discharged to a textile print target pretreated with the pretreatment liquid of the present invention, the specific resin particle contained in the pretreatment liquid, and the ink component having anionic property aggregate on the surface of the textile print target. The specific resin particle and the anionic ink component which are aggregated firmly adhere to the surface of the textile print target. As a result, the pretreatment liquid of the present invention suppresses deterioration, of color development and of tactile sensation, attributable to the penetration of the ink component into the textile print target, and occurrence of bleeding attributable to diffusion of the ink component (particularly pigment) inside the textile print target. In addition, the pretreatment liquid of the present invention contains a specific solvent containing water and polyvalent alcohol. The specific solvent has an appropriately low affinity with the cationic resin. Therefore, in the pretreatment liquid of the present invention, the cationic resin does not dissolve in the specific solvent and stably exists in the state of resin particles dispersed in the specific solvent (emulsion state). Further, the specific resin particle has a relatively large particle size. Therefore, when the textile print target is pretreated, the pretreatment liquid of the present invention does not permeate into the textile print target, and the specific resin particle tends to stay on the surface of the textile print target. The specific resin particle that stays on the surface of the textile print target aggregates with the ink component on the surface of the textile print target. From the above, the pretreatment liquid of the present invention can form the textile printed matter with excellent color development, while suppressing occurrence of the bleeding and deterioration of the tactile sensation.

[Specific Solvent]

Specific solvents include water and polyvalent alcohol. The specific solvent may further contain a water-soluble organic solvent other than the polyvalent alcohol, but preferably contains only water and polyvalent alcohol.

The SP value of the specific solvent is preferably 30 $(J/cm^3)^{1/2}$ or more and 45 $(J/cm^3)^{1/2}$ or less, and more preferably 35 $(J/cm^3)^{1/2}$ or more and 40 $(J/cm^3)^{1/2}$ or less. By setting the SP value of the specific solvent to 30 $(J/cm^3)^{1/2}$ or more and 45 $(J/cm^3)^{1/2}$ or less, the affinity between the specific solvent and the cationic resin tends to appropriately decrease. As a result, the stability of the pretreatment liquid of the present invention as an emulsion can be improved.

The SP value of the specific solvent is a weighted average value of the SP value of water and the SP value of polyvalent alcohol, calculated by the following formula.

$$SP \text{ value of specific solvent} = (\text{Mass of water} \times SP \text{ value of water} + \text{Mass of polyvalent alcohol} \times SP \text{ value of polyvalent alcohol})/\text{Mass of specific solvent}$$

(Water)

In the pretreatment liquid of the present invention, the water content is preferably 20.0% by mass or more and 70.0% by mass or less, and more preferably 45.0% by mass or more and 60.0% by mass or less. The affinity of the specific solvent and the cationic resin tends to appropriately decrease. As a result, the stability of the pretreatment liquid of the present invention as an emulsion can be improved.

(Polyvalent Alcohol)

A polyvalent alcohol is an alkane substituted with a multiplicity of hydroxy groups. Examples of the above alkanes include a linear alkane having 2 or more and 10 or less carbon atoms and a branched alkane having 2 or more and 10 or less carbon atoms. The number of hydroxy groups contained in the polyvalent alcohol is preferably 2 or more and 5 or less, and more preferably 2 or more and 3 or less. The number of carbon atoms in the polyvalent alcohol is preferably 2 or more and 5 or less, and more preferably 2 or more and 3 or less.

Examples of polyvalent alcohols include ethylene glycol, propylene glycol, butane diol, pentane diol, hexane diol, neopentyl glycol, 2-methyl-1,3-propane diol, 2-methyl-1,4-butane diol, tetrahydroxy butane, glycerin, trimethylol propane and pentaerythritol. As the polyvalent alcohol, ethylene glycol, propylene glycol or glycerin is preferable.

The content ratio of the polyvalent alcohol in the pretreatment liquid of the present invention is preferably 20.0% by mass or more and 75.0% by mass or less, more preferably 30.0% by mass or more and 60.0% by mass or less, and further preferably 35.0% by mass or more and 45.0% by mass or less. By setting the content ratio of polyvalent alcohol to 20.0% by mass or more and 75.0% by mass or less, the affinity between the specific solvent and the cationic resin tends to appropriately decrease. As a result, the stability of the pretreatment liquid of the present invention as an emulsion can be improved.

[Specific Resin Particle]

The specific resin particles include a cationic resin having a cationic group. The specific resin particles are dispersed in the specific solvent to form an emulsion. Therefore, the pretreatment liquid of the present invention is usually opaque in external view.

The particle size of the specific resin particle is 30 nm or more and 150 nm or less, preferably 45 nm or more and 80 nm or less. By setting the particle size of the specific resin particle to 30 nm or more, the specific resin particles can more easily stay on the surface of the textile print target. The specific resin particles that stay on the surface of the textile print target aggregate with the ink component on the surface of the textile print target. As a result, the pretreatment liquid of the present invention can form a textile printed matter with further excellent color development, while more effectively suppressing occurrence of the bleeding and deterioration of the tactile sensation. By setting the particle size of the specific resin particle to 150 nm or less, the discharge property of the pretreatment liquid of the present invention can be improved.

The valence of the cationic group is, for example, 1 or 2. Examples of the cationic groups include an amino group (for example, a primary amino group, a secondary amino group and a tertiary amino group) and a quaternary ammonium group. The tertiary amino group may form an aromatic heterocycle (for example, a pyridine ring). The secondary amino group may form a heterocyclic amine group (e.g., a piperidine ring and a pyrrolidine ring). As the cationic group, an amino group or a quaternary ammonium group is preferable, and examples thereof include a trimethyl ammonium group, a dimethyl amino group, a pyridyl group, a group represented by the following chemical formula (A), and —$NH_2$. In the following chemical formula, each * denotes a bond. The cationic group may form a salt together with an acid (for example, hydrochloric acid and acetic acid) or a halogen atom (for example, a fluorine atom, a chlorine atom, a bromine atom and an iodine atom).

[Chemical 1]

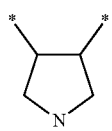

(A)

(Cationic Resin)

It is preferable that the cationic resin contains a specific repeating unit (hereinafter, may be referred to as a repeating unit (1)) derived from a cationic group-containing unsaturated monomer. The cationic resin may have only the repeating unit (1) as a repeating unit, but preferably includes the repeating unit (1), and a repeating unit (2) that is derived from an unsaturated monomer having no cationic group. In this way, when the cationic resin contains the repeating unit (2), the affinity between the specific solvent and the cationic resin tends to appropriately decrease. As a result, the stability of the pretreatment liquid of the present invention as an emulsion can be improved.

The cationic group-containing unsaturated monomer has, for example, a cationic group and a polymerizable group (for example, a vinyl group, an allyl group, and a (meth)acryloyl group). The number of cationic groups in the cationic group-containing unsaturated monomer is preferably one. The number of polymerizable groups in the cationic group-containing unsaturated monomer is preferably 1 or 2. Specific examples of the cationic group-containing unsaturated monomer preferably include dimethylaminopropylacrylamide methyl chloride quaternary salt, dimethylaminopropylacrylamide hydrochloride, vinylpyridine (especially, p-vinylpyridine), diallylamine hydrochloride, or allylamine hydrochloride.

The content ratio of the repeating unit (1) in the cationic resin is preferably 10.0% by mass or more and 80.0% by mass or less, more preferably 30.0% by mass or more and 70.0% by mass or less, and further preferably 50.0% by mass or more and 70.0% by mass or less. By setting the content ratio of the repeating unit (1) to 10.0% by mass or more, it is possible to impart sufficient cationic property to the cationic resin. By setting the content ratio of the repeating unit (1) to 80.0% by mass or less, the affinity between the specific solvent and the cationic resin tends to appropriately decrease. As a result, the stability of the pretreatment liquid of the present invention as an emulsion can be improved.

Unsaturated monomers that do not have a cationic group include, for example, vinyl compound, (meth)acrylic acid, (meth)acrylic acid alkylester, (meth)acrylic acid cycloalkyl ester, and ethylenic unsaturated carboxylic acid. Examples of vinyl compounds include ethylene, propylene and styrene. Examples of (meth)acrylic acid alkylester include (meth)acrylic acid methyl, (meth)acrylic acid ethyl, (meth) acrylic acid propyl, (meth)acrylic acid butyl, (meth)acrylic acid hexyl, (meth)acrylic acid octyl, and (meth)acrylic acid 2-ethylhexyl. Examples of (meth)acrylic acid cycloalkyl ester include (meth)acrylic acid cyclopentyl, (meth)acrylic acid cyclohexyl, and (meth)acrylic acid cyclooctyl. Examples of the ethylenic unsaturated carboxylic acids include maleic acid, itaconic acid, citraconic acid, and phthalic acid. The ethylenic unsaturated carboxylic acid may be anhydride.

As an unsaturated monomer having no cationic group, styrene, (meth)butyl acrylate, (meth)cyclohexyl acrylate, or maleic acid is preferable.

In the cationic resin, the content ratio of the repeating unit (2) is preferably 20.0% by mass or more and 90.0% by mass or less, more preferably 30.0% by mass or more and 70.0% by mass or less, and further preferably 30.0% by mass or more and 50.0% by mass or less. By setting the content ratio of the repeating unit (2) to 20.0% by mass or more and 90.0% by mass or less, the affinity between the specific solvent and the cationic resin tends to appropriately decrease. As a result, the stability of the pretreatment liquid of the present invention as an emulsion can be improved.

Preferable examples of cationic resins include a copolymer of butyl acrylate and dimethylaminopropylacrylamide methyl chloride quaternary salt, a copolymer of butyl acrylate and dimethylaminopropylacrylamide hydrochloride, a copolymer of styrene and p-vinylpyridine, a copolymer of cyclohexyl methacrylate and diallylamine hydrochloride, or a copolymer of styrene, maleic acid, and allylamine hydrochloride.

The SP value of the cationic resin is preferably 10 $(J/cm^3)^{1/2}$ or more and 20 $(J/cm^3)^{1/2}$ or less, and more preferably 15 $(J/cm^3)^{1/2}$ or more and 20 $(J/cm^3)^{1/2}$ or less. By setting the SP value of the cationic resin to 10 $(J/cm^3)^{1/2}$ or more and 20 $(J/cm^3)^{1/2}$ or less, the affinity between the specific solvent and the cationic resin tends to appropriately decrease. As a result, the stability of the pretreatment liquid of the present invention as an emulsion can be improved.

The difference between the SP value of the specific solvent and the SP value of the cationic resin is preferably 15 $(J/cm^3)^{1/2}$ or more and 25 $(J/cm^3)^{1/2}$ or less, and more preferably 18 $(J/cm^3)^{1/2}$ or more and 22 $(J/cm^3)^{1/2}$ or less. By setting the above difference to 15 $(J/cm^3)^{1/2}$ or more and 25 $(J/cm^3)^{1/2}$ or less, the affinity of the specific solvent and the cationic resin is appropriately lowered. As a result, the stability of the pretreatment liquid of the present invention as an emulsion can be improved.

The content ratio of the specific resin particles in the pretreatment liquid of the present invention is preferably 1.0% by mass or more and 5.0% by mass or less, and more preferably 2.0% by mass or more and 3.0% by mass or less. By setting the content ratio of the specific resin particles to 1.0% by mass or more, it is possible to form a textile printed matter with further excellent color development, while more effectively suppressing occurrence of the bleeding and deterioration of the tactile sensation. By setting the content ratio of the specific resin particles to 5.0% by mass or less, the discharge property of the pretreatment liquid of the present invention can be improved.

(Other Components)

The pretreatment liquid of the present invention, if necessary, may further include known additives (more specifically, for example, a surfactant, a dissolution stabilizer, an anti-drying agent, an antioxidant, a viscosity regulator, a pH regulator, and an antifungal agent. It is preferable that the pretreatment liquid of the present invention further contains the surfactant.

Surfactants improve the permeability (wetting property) of the pretreatment liquid of the present invention to the textile print target. Examples of the surfactants include an anionic surfactant, a cationic surfactant and a nonionic surfactant. As the surfactant, the nonionic surfactant is preferable.

The nonionic surfactant includes, for example, polyoxyethylene dodecyl ether, polyoxyethylene hexadecyl ether, polyoxyethylene nonyl phenyl ether, polyoxyethylene sorbitan monooleate ether, monodecanoyl sucrose, and ethylene oxide adduct of acetylenic glycol. In the pretreatment liquid of the present invention, as the nonionic surfactant, an ethylene oxide adduct of acetylenic glycol is preferable.

When the pretreatment liquid of the present invention contains the surfactant, the content ratio of the surfactant in the pretreatment liquid of the present invention is preferably 0.1% by mass or more and 5.0% by mass or less, and more preferably 0.3% by mass or more and 1.0% by mass or less.

[Manufacturing Method of Pretreatment Liquid]

The pretreatment liquid of the present invention can be prepared, for example, by mixing a resin particle dispersion liquid containing specific resin particles, water, the polyvalent alcohol, and an additive, as needed, added. The resin particle dispersion liquid contains, for example, specific resin particles, water, and a surfactant. The resin particle dispersion liquid can be prepared by reacting (emulsifying polymerization), for example, a monomer (for example, a cationic group-containing unsaturated monomer and an unsaturated monomer having no cationic group) which becomes a raw material of a cationic resin, a surfactant (for example, a cationic surfactant), water, and a polymerization initiator (for example, potassium persulfate).

Second Embodiment: Ink Set

Next, an ink set according to a second embodiment of the present invention will be described. The ink set of the present invention includes an ink-jet textile printing ink (hereinafter, may be referred to as an ink) and the pretreatment liquid described in the first embodiment.

[Ink]

The ink contains a pigment, a binder resin particle, a water-soluble organic solvent, and water. The pigment preferably has an anionic property. The binder resin particle preferably has an anionic property.

(Pigment)

Pigments are dispersed, for example, in a solvent and present. From the viewpoint of improving the color density, hue, or stability of the ink, the D50 of the pigment is preferably 30 nm or more and 250 nm or less, and more preferably 70 nm or more and 160 nm or less.

Examples of pigments include yellow pigments, orange pigments, red pigments, blue pigments, purple pigments, and black pigments. Examples of yellow pigments include C.I. pigments yellow (74, 93, 95, 109, 110, 120, 128, 138, 139, 151, 154, 155, 173, 180, 185, and 193). Examples of orange pigments include C.I. pigments orange (34, 36, 43, 61, 63, and 71). Examples of red pigments include C.I. pigments red (122 and 202). Examples of blue pigments include C.I. pigments blue (15, more specifically 15:3). Examples of purple pigments include C.I. pigments violet (19, 23, and 33). Examples of the black pigment include C.I. pigment black (7).

The content ratio of pigments in the ink is preferably 1.0% by mass or more and 12.0% by mass or less, and more preferably 2.0% by mass or more and 6.0% by mass or less. By setting the content ratio of pigments to 1.0% by mass or more, the image density of the textile printed matter formed by the ink set of the present invention can be improved. In addition, fluidity of the ink can be improved by setting the content ratio of pigments to 12.0% by mass or less.

(Binder Resin Particle)

The binder resin particles include the binder resin. The content ratio of the binder resins in the binder resin particles is preferably 80% by mass or more, more preferably 95% by mass or more, and further preferably 100% by mass.

Examples of the binder resins include (meth)acrylic resin, styrene resin, polyvinyl resin, polyester resin, amino resin, epoxy resin, urethane resin, polyether resin, polyamide resin, phenol resin, silicone resin, fluorine resin, and a copolymer including monomers of these resins (for example, styrene-(meth)acrylic resin). The urethane resin is preferable as the binder resin.

The content ratio of the binder resin particles in the ink is preferably 1.0% by mass or more and 15.0% by mass or less, and more preferably 3.0% by mass or more and 10.0% by mass or less. By setting the content ratio of the binder resin particles to 1.0% by mass or more, the frictional fastness of the textile printed matter to be formed can be improved. By setting the content ratio of the binder resin particles to 15.0% by mass or less, the discharge stability of the ink can be ensured.

(Water)

The content ratio of the water in the ink is preferably 30.0% by mass or more and 80.0% by mass or less, and more preferably 40.0% by mass or more and 60.0% by mass or less.

(Water-Soluble Organic Solvent)

Examples of the water-soluble organic solvents include glycol compounds, polyvalent alcohol ether compounds, lactam compounds, nitrogen-containing compounds, acetate compounds, thiodiglycol, glycerin and dimethyl sulfoxide.

Examples of the glycol compounds include ethylene glycol, propylene glycol, diethylene glycol, triethylene glycol, and tetraethylene glycol.

Examples of polyvalent alcohol ether compounds include diethylene glycol diethyl ether, diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, and propylene glycol monomethyl ether.

Examples of the lactam compounds include 2-pyrrolidone and N-methyl-2-pyrrolidone.

Examples of the nitrogen-containing compounds include 1,3-dimethyl imidazolidinone, formamide, and dimethylformamide.

Examples of acetate compounds include diethylene glycol monoethyl ether acetate.

As the water-soluble organic solvent, glycol compound is preferable, and propylene glycol is more preferable.

The content ratio of the water-soluble organic solvents in the ink is preferably 15.0% by mass or more and 60.0% by mass or less, and more preferably 25.0% by mass or more and 50.0% by mass or less.

(Other Components)

The ink may further contain known additives (more specifically, for example, surfactants, dissolution stabilizers, anti-drying agents, antioxidants, viscosity regulators, pH regulators and fungicides) as needed. It is preferable that the ink further contains a surfactant.

The surfactant improves the compatibility and dispersion stability of each component contained in the ink. In addition, the surfactant improves the permeability (wetting property) of the ink to the textile print target. Examples of the surfactants include an anionic surfactant, a cationic surfactant and a nonionic surfactant. As the surfactant, the nonionic surfactant is preferable. Examples of the nonionic surfactants include any compound similar to the nonionic surfactants exemplified in the above pretreatment liquid. In the ink, as the nonionic surfactant, an ethylene oxide adduct of acetylenic glycol is preferable.

When the ink contains the surfactant, the content ratio of the surfactant in the ink is preferably 0.05% by mass or more and 5.0% by mass or less, and more preferably 0.2% by mass or more and 1.0% by mass or less.

[Preparation Method of Ink]

The ink can be prepared by, for example, uniformly mixing, by using a stirrer, a pigment dispersion liquid, a binder resin particle dispersion liquid, water, a water-soluble organic solvent, and any other component (for example, a surfactant), as necessary, to be blended. The pigment dispersion liquid contains, for example, a pigment and water. The binder resin particle dispersion liquid contains, for example, binder resin particles and water. In the preparation of ink, after each component is uniformly mixed, foreign matters and coarse particles may be removed by a filter filtration treatment or a centrifugation treatment.

Third Embodiment: Ink-Jet Textile Printing Method

Next, an ink-jet textile printing method according to a third embodiment of the present invention will be described. The ink-jet textile printing method according to the present invention is an ink-jet textile printing method that forms an image in an image-forming area of the textile print target by using the ink set according to the second embodiment, and includes a pretreatment process that discharges, by an ink-jetting, the pretreatment liquid to the image-forming area, and an image-forming process that discharges, by an ink-jetting, the ink to the image-forming area. It is preferable that the ink-jet textile printing method of the present invention further includes, after the image-forming process, a heating process of heating the textile print target. Since the ink-jet textile printing method of the present invention uses the ink set according to the second embodiment, it is possible to form the textile printed matter with excellent color development, while suppressing occurrence of the bleeding and deterioration of the tactile sensation.

The textile print target to be used is not particularly limited, and examples thereof include cotton fabric, silk fabric, linen fabric, acetate fabric, rayon fabric, nylon fabric, polyurethane fabric, and polyester fabric. The cotton fabric is preferable as the textile print target.

[Pretreatment Process]

In this process, the pretreatment liquid is discharged, by an ink-jetting, to the image-forming area. In this process, it is preferable to apply the pretreatment liquid only to the area, among the image-forming areas, to which the ink is discharged. This can reduce the amount of the pretreatment liquid used. The head used in this process is not particularly limited, and examples thereof include a piezo type head and a thermal ink-jet type head.

In this process, the discharge amount of the pretreatment liquid is, for example, 5 g/m$^2$ or more and 40 g/m$^2$ or less.

(Image-Forming Process)

In this process, the ink is discharged, by an ink-jetting, to the image-forming area to thereby form a desired image. The head used in this process is not particularly limited, and examples thereof include a piezo type head and a thermal ink-jet type head.

In this process, the discharge amount of ink is, for example, 5 g/m$^2$ or more and 40 g/m$^2$ or less.

[Heating Process]

In this process, the textile print target is heated after the image-forming process. This removes any volatile component contained in the pretreatment liquid and ink, and promotes the fixation of the image on the textile print target.

As heating conditions, for example, temperature can be 120° C. or more and 180° C. or less, and time can be 1 minute or more and 10 minutes or less.

Fourth Embodiment: Ink-Jet Textile Printing Apparatus

Next, an ink-jet textile printing apparatus according to a fourth embodiment of the present invention will be described. The ink-jet textile printing apparatus of the present invention is an ink-jet textile printing apparatus that forms an image in an image-forming area of a textile print target by using the ink set according to the second embodiment, and includes a pretreatment portion that discharges, by an ink-jetting, the pretreatment liquid to the image-forming area, and an image-forming portion that discharges, by an ink-jetting, the ink to the image-forming area. Since the ink-jet textile printing apparatus of the present invention uses the ink set according to the second embodiment, it is possible to form a textile printed matter with excellent color development, while suppressing occurrence of the bleeding and deterioration of the tactile sensation.

It is preferable that the pretreatment portion should apply the pretreatment liquid only to the area, among the image-forming areas, to which the ink is discharged by the image-forming portion. This can reduce the amount of the pretreatment liquid used.

The pretreatment portion and the image-forming portion are not particularly limited, and examples thereof include a piezo type head and a thermal ink-jet type head.

Hereinafter, the details of the ink-jet textile printing apparatus of the present invention will be described with reference to the drawings. In addition, the drawings to be referred to are schematically shown mainly for each component for ease of understanding, and the size, number, etc. of each component shown may be different from reality for the convenience of drawing creation.

FIG. 1 is a side view showing a main part of an ink-jet textile printing apparatus, which is an example of the ink-jet textile printing apparatus of the present invention. The ink-jet textile printing apparatus shown in FIG. 1 includes an image-forming portion 1 that discharges ink, a pretreatment portion 2 that discharges pretreatment liquid, and a mounting table 3. A textile print target T is mounted on the mounting table 3. The image-forming portion 1 has a first image-forming section 1a, a second image-forming section 1b, a third image-forming section 1c, and a fourth image-forming section 1d. The first image-forming section 1a, the second image-forming section 1b, the third image-forming section 1c, and the fourth image-forming section 1d, respectively, discharge different colored inks (for example, cyan ink, magenta ink, yellow ink, and black ink). The image-forming portion 1 and the pretreatment portion 2 are arranged above the mounting table 3 so that the ink and the pretreatment liquid can be discharged to the textile print target T.

The mounting table 3 transports the textile print target T by horizontally moving in a specific direction (for example, to the left or right in FIG. 1). The image-forming portion 1 and the pretreatment portion 2 horizontally move in a direction orthogonal to the transport direction of the textile print target T. With this, the image-forming portion 1 and the pretreatment portion 2 respectively discharge the ink and the pretreatment liquid to arbitrary positions of the textile print target T. The ink-jet textile printing apparatus of FIG. 1 is what is called a flatbed type ink-jet textile printing apparatus.

As described above, the example of the ink-jet textile printing apparatus of the present invention has been described based on the drawings. However, the ink-jet textile printing apparatus of the present invention is not limited to the ink-jet textile printing apparatus shown in FIG. 1. For example, the number of recording heads provided in the ink-jet textile printing apparatus of the present invention may be 1 to 3 or 5 or more. Further, the ink-jet textile printing apparatus of the present invention may be a non-flat bed type ink-jet textile printing apparatus. Further, the ink-jet textile printing apparatus of the present invention may include two or more pretreatment portions.

Examples

Examples of the present invention will be described below. However, the present invention is not limited to the following examples.

In this embodiment, the SP value indicates the value calculated by "Hansen Solubility Parameter in Practice (HSPiP) Ver. 5.2.06" (Developer: Prof. Steven Abbott et al.), which is the SP value calculation and estimation software.

[Preparation of Pretreatment Liquid]

Pretreatment liquids (T-1) to (T-9) and (t-1) to (t-3) were prepared by the following methods.

(Preparation of Resin Particle Dispersion Liquid A)

A 1 L capacity 3-necked flask equipped with a thermometer and a stirring blade was used as a reaction vessel. 790.0 g of ion-exchange water, and 29.0 g of cationic surfactant ("QUARTAMIN (registered trademark) 24P made by Kao Corporation", lauryl trimethyl ammonium chloride) were added to the reaction vessel. Then, using a water bus, the temperature inside the reaction vessel was raised to 80° C., and then this temperature was maintained. Separately, a compound liquid A containing 89.4 g of butyl acrylate and 49.5 g of dimethylaminopropylacrylamide methyl chloride quaternary salt and a compound liquid B containing 0.5 g of potassium persulfate and 30.0 g of ion-exchange water were prepared. Then, the compound liquids A and B were added dropwise to the reaction vessel for 5 hours. Next, the contents were polymerized by keeping the internal temperature of the reaction vessel at 80° C. for 2 hours. With this, the resin particle dispersion liquid A was obtained. The resin particle dispersion liquid A contained resin particles containing a cationic resin having a quaternary ammonium group.

Resin particle dispersion liquids B to G were prepared by the same method as that of the preparation of the resin particle dispersion liquid A, except that the following points were changed.

(Preparation of Resin Particle Dispersion Liquid B)

In the preparation of a resin particle dispersion liquid B, 49.5 g of dimethylaminopropylacrylamide methyl chloride quaternary salt was changed to 49.6 g of dimethylaminopropylacrylamide hydrochloride. The resin particle dispersion liquid B contained resin particles containing a cationic resin having a tertiary amino group.

(Preparation of Resin Particle Dispersion Liquid C)

In the preparation of a resin particle dispersion liquid C, dimethylaminopropylacrylamide methyl chloride quaternary salt was changed to the same amount of p-vinylpyridine, and the butyl acrylate was changed to the same amount of styrene. The resin particle dispersion liquid C contained resin particles containing a cationic resin having a tertiary amino group.

(Preparation of Resin Particle Dispersion Liquid D)

In the preparation of a resin particle dispersion liquid D, 49.5 g of dimethylaminopropylacrylamide methyl chloride quaternary salt was changed to 98.5 g of p-vinylpyridine, and 89.4 g of butyl acrylate was changed to 45.5 g of styrene. The resin particle dispersion liquid D contained resin particles containing a cationic resin having a tertiary amino group.

(Preparation of Resin Particle Dispersion Liquid E)

In the preparation of a resin particle dispersion liquid E, 49.5 g of dimethylaminopropylacrylamide methyl chloride quaternary salt was changed to 44.5 g of N-isopropyl acrylamide. The resin particle dispersion liquid E contained resin particles containing a resin having an amide group.

(Preparation of Resin Particle Dispersion Liquid F)

In the preparation of a resin particle dispersion liquid F, 49.5 g of dimethylaminopropylacrylamide methyl chloride quaternary salt was changed to 40.0 g of diallylamine hydrochloride, and 89.4 g of butyl acrylate was changed to cyclohexyl methacrylate 75.0 g. The resin particle dispersion liquid F contained resin particles containing a cationic resin having a secondary amino group.

(Preparation of Resin Particle Dispersion Liquid G)

In the preparation of a resin particle dispersion liquid G, 49.5 g of dimethylaminopropylacrylamide methyl chloride quaternary salt was changed to 15.0 g of allylamine hydrochloride, and 89.4 g of butyl acrylate was changed to 40.0 g of styrene and 40.0 g of maleic acid. The resin particle dispersion liquid G contained resin particles containing a cationic resin having a primary amino group.

The particle size of the resin particles contained in the resin particle dispersion liquids A to G was measured by the following methods respectively. First, a measurement sample was prepared by diluting, 1000 times with ion-exchange water, the resin particle dispersion liquids to be measured. Next, the particle size was measured by the cumulant method, by using a dynamic light scattering type particle size distribution measuring apparats ("Zetasizer Nano ZS" made by Sysmex Corporation). The measurement was performed according to "ISO (International Organization for Standardization) 13321: 1996". The measurement results are shown in Table 1 below.

Using the above HSPiP, the SP values of the cationic resins contained in the resin particle dispersion liquids A to G were calculated respectively. The calculation results are shown in Table 1 below.

TABLE 1

| RESIN PARTICLE DISPERSION LIQUIDS | RESIN FUNCTIONAL GROUP | RESIN PARTICLE SIZE [nm] | SP VALUE | SOLID CONTENT CONCENTRATION [wt %] |
| --- | --- | --- | --- | --- |
| A | QUATERNARY AMMONIUM GROUP | 50 | 19 | 14 |
| B | TERTIARY AMINO GROUP | 60 | 18 | 14 |
| C | TERTIARY AMINO GROUP | 70 | 20 | 14 |
| D | TERTIARY AMINO GROUP | 20 | 21 | 14 |

TABLE 1-continued

| RESIN PARTICLE DISPERSION LIQUIDS | RESIN FUNCTIONAL GROUP | RESIN PARTICLE SIZE [nm] | SP VALUE | SOLID CONTENT CONCENTRATION [wt %] |
|---|---|---|---|---|
| E | AMIDE GROUP | 50 | 20 | 14 |
| F | SECONDARY AMINO GROUP | 40 | 19 | 12 |
| G | PRIMARY AMINO GROUP | 80 | 20 | 10 | changed as shown in Table 2 below. In addition, the SP values of the solvents of the pretreatment liquids (T-2) to (T-8) and (t-1) to (t-3) were calculated by HSPiP. The calculation results are shown in Table 2 below.

The external views of the prepared pretreatment liquids (T-1) to (T-8) and (t-1) to (t-3) were observed. The pretreatment liquids (T-1) to (T-8) and (t-3) were opaque solutions. Therefore, regarding the pretreatment liquids (T-1) to (T-8) and (t-3), it was determined that resin particles were dispersed in the state of resin particles without being dissolved in the solvent. On the other hand, the pretreatment liquids (t-1) and (t-2) were transparent solutions. Therefore, it was determined that the resin particles of the pretreatment liquids (t-1) and (t-2) were dissolved in the solvent.

In Table 2 below, "PG", "EG", "Gly", and "BTG" respectively indicate propylene glycol, ethylene glycol, glycerin, and triethylene glycol monobutyl ether. "Parts" and "wt %" respectively indicate parts by mass and % by mass.

TABLE 2

| | RAW MATERIAL | | | | COMPOSITION | | | | |
|---|---|---|---|---|---|---|---|---|---|
| | RESIN PARTICLE DISPERSION LIQUID | | SOLVENT | | | | SOLVENT | | |
| | | ION-EXCHANGE WATER | WATER-SOLUBLE ORGANIC SOLVENT | | RESIN PARTICLE | WATER | POLYVALENT ALCOHOL | SP | EXTERNAL |
| TYPE | TYPE | PARTS | [PARTS] | TYPE | PARTS | [wt %] | [wt %] | [wt %] | VALUE | VIEW |
| T-1 | A | 20.0 | 40.0 | PG | 39.5 | 2.8 | 56.6 | 39.5 | 39 | OPAQUE |
| T-2 | B | 20.0 | 40.0 | PG | 39.5 | 2.8 | 56.6 | 39.5 | 39 | OPAQUE |
| T-3 | C | 20.0 | 40.0 | PG | 39.5 | 2.8 | 36.6 | 39.5 | 39 | OPAQUE |
| T-4 | A | 20.0 | 10.0 | PG | 79.3 | 2.5 | 24.2 | 72.3 | 35 | OPAQUE |
| T-3 | A | 20.0 | 40.0 | EG | 39.5 | 2.8 | 56.6 | 39.5 | 40 | OPAQUE |
| T-6 | A | 20.0 | 40.0 | Gly | 39.5 | 2.8 | 56.6 | 39.5 | 43 | OPAQUE |
| T-7 | F | 20.0 | 40.0 | PG | 39.5 | 2.4 | 57.0 | 39.5 | 39 | OPAQUE |
| T-8 | G | 20.0 | 40.0 | PG | 39.5 | 2.0 | 57.4 | 39.5 | 39 | OPAQUE |
| t-1 | D | 20.0 | 40.0 | PG | 39.3 | 2.8 | 56.5 | 39.5 | 39 | TRANSPARENT |
| t-2 | A | 20.0 | 40.0 | BTG | 39.5 | 2.8 | 56.6 | 39.5 | 34 | TRANSPARENT |
| t-3 | E | 20.0 | 40.0 | PG | 39.3 | 2.8 | 56.7 | 39.5 | 39 | OPAQUE |

The resin particles contained in the resin particle dispersion liquids A to D and F to G contained a cationic resin having a cationic group. That is, the resin particle dispersion liquids A to D and F to G contained specific resin particles.

(Preparation of Pretreatment Liquid (T-1))

A pretreatment liquid (T-1) was obtained by mixing 20.0 g of the above resin particle dispersion liquid A, 40.0 g of ion-exchange water, 39.5 g of propylene glycol as a water-soluble organic solvent, and 0.5 g of nonionic surfactant ("Surfynol (registered trademark) 440" made by Nissin Chemical Co., Ltd., ethylene oxide adduct of acetylenic glycol). In the pretreatment liquid (T-1), the SP value of the solvent (ion-exchange water and propylene glycol) was calculated by HSPiP and found to be 39 $(J/cm^3)^{1/2}$.

(Preparation of Pretreatment Liquids (T-2) to (T-8) and (t-1) to (t-3))

The pretreatment liquids (T-2) to (T-8) and (t-1) to (t-3) were prepared in the same method as that of the preparation of the pretreatment liquid (T-1), except that the types and additive amounts of the resin particle dispersion liquid, ion-exchange water, and water-soluble organic solvent were The solvents contained in the pretreatment liquids (T-1) to (T-8), (t-1) and (t-3) contained water and polyvalent alcohol. That is, the solvent contained in the pretreatment liquids (T-1) to (T-8), (t-1) and (t-3) was a specific solvent.

[Preparation of Ink]

(Preparation of Ink (I-a))

125 g of ion-exchange water, and 2 g of nonionic surfactant ("Surfynol (registered trademark)$^{440}$" made by Nissin Chemical Co., Ltd., ethylene oxide adduct of acetylenic glycol) were put in a 3-necked flask provided with a stirring blade and having a capacity of 1 L. Next, while stirring the contents of the above 3-necked flask, 165 g of propylene glycol, 100 g of black pigment ("AE2078F" made by Sanyo Color Works, LTD, C.I. Pigment Black 7, solid content: 20% by mass), and 108 g of a binder resin particle dispersion liquid containing urethane resin particles ("SUPERFLEX (registered trademark) 470" made by DKS Co. Ltd., solid content: 38% by mass) were added in this order in the 3-necked flask. Next, the contents of the above 3-necked flask were stirred for 10 minutes. This gave an ink (I-a).

(Preparation of Ink (I-b))

140 g of ion-exchange water, and 2 g of nonionic surfactant ("Surfynol (registered trademark) 440" made by Nissin Chemical Co., Ltd., ethylene oxide adduct of acetylenic glycol) were put in a 3-necked flask provided with a stirring blade and having a capacity of 1 L. Next, while stirring the contents of the above 3-necked flask, 225 g of propylene glycol, 83 g of black pigment ("AC-AK1" made by Dainichiseika Color & Chemicals Mfg. Co., Ltd., C.I. Pigment Black 7, solid content: 15% by mass), and 50 g of a binder resin particle dispersion liquid containing urethane resin particles ("Eternacol (registered trademark) UW-1527F" made by Ube Industries, Ltd., solid content: 40% by mass) were added in this order in the 3-necked flask. Next, the contents of the above 3-necked flask were stirred for 10 minutes. This gave an ink (I-b).

[Preparation of Ink Set]

One of the pretreatment liquids (T-1) to (T-8) and (t-1) to (t-3) and one of the inks (I-a) and (I-b) were combined as shown in Table 3 below. With this, ink sets of Examples 1 to 9 and Comparative Examples 1 to 3 were prepared. In Comparative Example 4, an ink set equipped with only the ink (I-a) was prepared.

pretreatment liquid by an ink-jetting. The amount of the applied pretreatment liquid was 10 g/m². In the evaluation of the ink set of Comparative Example 4, the above operation was not performed. Next, the ink chamber of the special cartridge was filled with the ink (specifically, any of ink (I-a) and (I-b)) provided in the ink set to be evaluated. Next, the special cartridge filled with the ink was mounted on the evaluation equipment. Then, with the evaluation equipment, a solid image was formed by discharging, by an ink-jetting, the ink to the entire surface of the textile print target. The amount of the applied ink was 20 g/m². Next, the textile print target on which the solid image was formed was dried by heating at 160° C. for 3 minutes. With this, an evaluation textile printed matter on which the solid image was formed was obtained. Next, with a fluorescence spectrophotometer ("FD-5" made by Konica Minolta, Inc.), color of the solid image of the evaluation textile printed matter was measured. The color development of the evaluation textile printed matter was determined according to the following criteria

TABLE 3

| | | | PRETREATMENT LIQUID | | | |
|---|---|---|---|---|---|---|
| | | RESIN | RESIN | | | |
| | TYPE | PARTICLE DISPERSION | FUNCTIONAL GROUP | PARTICLE SIZE [nm] | SOLVENT | INK |
| EXAMPLE 1 | T-1 | A | QUATERNARY AMMONIUM GROUP | 50 | PG | I-a |
| EXAMPLE 2 | T-2 | B | TERTIARY AMINO GROUP | 60 | PG | I-a |
| EXAMPLE 3 | T-3 | C | TERTIARY AMINO GROUP | 70 | PG | I-a |
| EXAMPLE 4 | T-4 | A | QUATERNARY AMMONIUM GROUP | 50 | PG | I-a |
| EXAMPLE 5 | T-5 | A | QUATERNARY AMMONIUM GROUP | 50 | EG | I-a |
| EXAMPLE 6 | T-6 | A | QUATERNARY AMMONIUM GROUP | 50 | Gly | I-a |
| EXAMPLE 7 | T-1 | A | QUATERNARY AMMONTUM GROUP | 50 | PG | I-b |
| EXAMPLE 8 | T-7 | F | SECONDARY AMINO GROUP | 40 | PG | I-a |
| EXAMPLE 9 | T-8 | G | PRIMARY AMINO GROUP | 80 | PG | |
| COMPARATIVE EXAMPLE 1 | t-1 | D | TERTIARY AMINO GROUP | 20 | PG | I-a |
| COMPARATIVE EXAMPLE 2 | t-2 | A | QUATERNARY AMMONIUM GROUP | 50 | BTG | I-a |
| COMPARATIVE EXAMPLE 3 | t-3 | E | AMIDE GROUP | 50 | PG | I-a |
| COMPARATIVE EXAMPLE 4 | — | — | — | — | — | I-a |

<Evaluation>

By the following method, a textile printed matter was formed using the ink sets of Examples 1 to 9 and Comparative Examples 1 to 4, and bleeding, tactile sensation, and color development were evaluated. The evaluation results are shown in Table 4 below.

[Evaluation Machine and Textile Print Target]

In the evaluation, an ink-jet textile printer ("PX-045a" made by Seiko Epson Corporation) was used as the evaluation equipment. A4 size cotton broad (made by Shikisensha CO., LTD.) was used as the textile print target.

[Color Development]

Pretreatment liquids (specifically, any of pretreatment liquids (T-1) to (T-8) and (t-1) to (t-3)) provided in the ink set to be evaluated were filled in the ink chamber of the special cartridge of the evaluation equipment. Next, a special cartridge filled with the pretreatment liquid was mounted on the evaluation equipment. Then, with the evaluation equipment, the pretreatment liquid was applied to the entire surface of the textile print target by discharging the based on the L* value of the solid image whose color was measured by the above fluorescence spectrophotometer.

(Criteria of Color Development)

A (Acceptable): L* is 24 or less

B (Rejected): L* is more than 24

[Bleeding]

Pretreatment liquids (specifically, pretreatment liquids (T-1) to (T-8) and (t-1) to (t-3)) provided in the ink set to be evaluated were filled in the ink chamber of the special cartridge of the evaluation equipment. Next, the special cartridge filled with the pretreatment liquid was mounted on the evaluation equipment. Then, with the evaluation equipment, the pretreatment liquid was applied to the entire surface of the textile print target by discharging the pretreatment liquid by an ink-jetting. The amount of the applied pretreatment liquid was 10 g/m². In the evaluation of the ink set of Comparative Example 4, the above operation was not performed. Next, the ink chamber of the special cartridge was filled with the ink (specifically, any of ink (I-a) and (I-b)) provided in the ink set to be evaluated. Next, a special cartridge filled with the ink was mounted on the evaluation equipment. Then, with the evaluation equipment, discharging the ink to the textile print target by an ink-jetting formed a thin line with hollow white (a thin line image composed of an image-forming portion and a fine line-shaped image non-forming portion). The amount of ink applied to the image-forming portion was 20 g/m². The line width of the thin line with hollow white (width of the non-image-forming portion) was 100 μm, 250 μm, 500 μm, 750 μm, or 1 mm. Next, the textile print target on which the thin line with hollow white was formed was dried by heating at 160° C. for 3 minutes. With this, the evaluation textile printed matter on which the solid image was formed was obtained. Next, the thin line with hollow white of the evaluation textile printed matter was visually observed, and it was confirmed whether or not the thin line with hollow white was interrupted due to the bleeding of the image-forming portion. The smaller the line width of the thin line with hollow white is, the more likely it is that interruption of the thin line with hollow white will occur due to the bleeding of the image-forming portion. The minimum value (minimum line width) of the line width that does not cause any interruption due to the bleeding of the image-forming portion was used as the evaluation value of bleeding. Whether or not the ink set can suppress occurrence of the bleeding was determined according to the following criteria.

(Criteria of Bleeding)

A (Acceptable): Minimum line width is 250 μm or less

B (Rejected): Minimum line width is more than 250 μm

[Tactile Sensation]

An unused textile print target was folded in half along the warp (in the length direction), and the distance (loop height) between the lower fabric and the upper fabric at the crease was measured. The measured loop height of the unused textile print target was defined as the loop height before textile printing. Next, the evaluation textile printed matter on which the solid image was formed was obtained by the same method as described in the evaluation of color development. Next, the area where the solid image of the evaluation textile printed matter was formed was folded in half along the warp (in the length direction), and the loop height was measured. The measured loop height of the evaluation textile printed matter was defined as the loop height after textile printing. The change rate of loop height (unit: %) before and after the textile printing was calculated according to the formula "Change rate of loop height=100×Loop height after textile printing/Loop height before textile printing". The lower the change rate of loop height is, the more the textile print target avoids becoming hard and avoids swelling even after the textile printing, indicating that deterioration of the tactile sensation of the textile printed matter is suppressed. Whether or not the ink set can suppress deterioration of the tactile sensation of the textile printed matter was determined according to the following criteria.

(Criteria of Tactile Sensation)

A (Acceptable): The change rate of loop height is 130% or less.

B (Rejected): The change rate of loop height is more than 130%.

TABLE 4

| | COLOR DEVELOPMENT | | BLEEDING | | TACTILE SENSATION | |
|---|---|---|---|---|---|---|
| | L* | DETERMINATION | MINIMUM LINE WIDTH [micrometer] | PARTICLE SIZE [nm] | LOOP HEIGHT [%] | DETERMINATION |
| EXAMPLE 1 | 24 | A | 250 | A | 120 | A |
| EXAMPLE 2 | 23 | A | 250 | A | 125 | A |
| EXAMPLE 3 | 24 | A | 250 | A | 120 | A |
| EXAMPLE 4 | 24 | A | 250 | A | 125 | A |
| EXAMPLE 5 | 24 | A | 250 | A | 120 | A |
| EXAMPLE 6 | 24 | A | 250 | A | 115 | A |
| EXAMPLE 7 | 24 | A | 250 | A | 110 | A |
| ENAMPLE 8 | 23 | A | 250 | A | 110 | A |
| EXAMPLE 9 | 24 | A | 250 | A | 130 | A |
| COMPARATIVE EXAMPLE 1 | 23 | A | 750 | B | 110 | A |
| COMPARATIVE EXAMPLE 2 | 22 | A | 750 | B | 105 | A |
| COMPARATIVE EXAMPLE 3 | 29 | B | 500 | B | 125 | A |
| COMPARATIVE EXAMPLE 4 | 32 | B | 750 | B | 140 | B |

As shown in Tables 3 and 4, the pretreatment liquids (T-1) to (T-9) used for the ink sets of Examples 1 to 9 are the ink-jet textile printing pretreatment liquids to be discharged by the ink-jet nozzle, and contained specific solvents and specific resin particles. Specific solvents include water and polyvalent alcohol. The specific resin particles include a cationic resin having a cationic group. The particle size of the specific resin particles is 30 nm or more and 150 nm or less. The ink sets of Examples 1 to 9 were able to form a textile printed matter with excellent color development, while suppressing occurrence of the bleeding and deterioration of the tactile sensation.

On the other hand, the ink sets of Comparative Examples 1 to 4 did not satisfy the above configuration. Therefore, the ink sets of Comparative Examples 1 to 4 could not form a textile printed matter with excellent color development, while suppressing occurrence of the bleeding and deterioration of the tactile sensation.

Specifically, the pretreatment liquid (t-1) used in Comparative Example 1 could not suppress occurrence of the bleeding because the particle size of the resin particles was less than 30 nm. Since the resin particles contained in the pretreatment liquid (t-1) had a small diameter, it is determined that they did not merely stay on the surface of the textile print target but penetrated into the textile print target. As a result, it is determined that the pretreatment liquid (t-1) could not fix the pigment of ink to the surface of the textile print target.

The pretreatment liquid (t-2) used in Comparative Example 2 could not suppress occurrence of the bleeding because the solvent did not contain polyvalent alcohol. Since the pretreatment liquid (t-2) has a high affinity between the solvent and the resin particle, it is determined that the resin particles could not maintain the state as particles and the resin particles were dissolved in the solvent. This can be confirmed by the transparent external view of the pretreatment liquid (t-2). Since the resin particles contained in the pretreatment liquid (t-2) were dissolved in the solvent, it is determined that they did not merely stay on the surface of the textile print target but penetrated into the textile print target. As a result, it is determined that the pretreatment liquid (t-2) could not fix the pigment of ink to the surface of the textile print target.

Regarding the pretreatment liquid (t-3) used in Comparative Example 3, since the resin particles did not contain the cationic resin, occurrence of the bleeding could not be suppressed and the textile printed matter with excellent color development could not be formed. Since the resin particles contained in the pretreatment liquid (t-3) do not have a cationic property, it is determined that the pigment of ink could not be fixed to the surface of the textile print target.

In Comparative Example 4, the pretreatment liquid was not used. As a result, the ink set of Comparative Example 4 could not form a textile printed matter with excellent color development, while suppressing occurrence of the bleeding and deterioration of the tactile sensation.

INDUSTRIAL APPLICABILITY

The pretreatment liquid, the ink set, the ink-jet textile printing method, and the ink-jet textile printing apparatus according to the present invention can be used to form the textile printed matter.

DESCRIPTION OF REFERENCE NUMERALS

1 Image-forming portion
1a First recording head
1b Second recording head
1c Third recording head
1d Fourth recording head
2 Pretreatment portion
3 Mounting table
T Textile print target

The invention claimed is:

1. An ink-jet textile printing pretreatment liquid comprising:
a specific solvent; and
a specific resin particle,
wherein
the specific solvent contains water and polyvalent alcohol,
the specific resin particle contains a cationic resin having a cationic group, and
a particle size of the specific resin particle is 40 nm or more and 80 nm or less,
wherein the cationic resin contains a specific repeating unit derived from a cation group-containing unsaturated monomer, and content ratio of the specific repeating unit in the cationic resin is 10.0% by mass or more and 80.0% by mass or less.

2. The ink-jet textile printing pretreatment liquid according to claim 1, wherein content ratio of the specific resin particles is 1.0% by mass or more and 5.0% by mass or less.

3. The ink-jet textile printing pretreatment liquid according to claim 1, wherein the polyvalent alcohol has 2 or more and 5 or less carbon atoms.

4. The ink-jet textile printing pretreatment liquid according to claim 3, wherein the polyvalent alcohol contains ethylene glycol, propanediol or glycerin.

5. The ink-jet textile printing pretreatment liquid according to claim 1, wherein content ratio of the polyvalent alcohol is 30.0% by mass or more and 60.0% by mass or less.

6. The ink-jet textile printing pretreatment liquid according to claim 1, wherein the cationic group contains an amino group or a quaternary ammonium group.

7. An ink set, comprising:
an ink-jet textile printing ink; and
the ink-jet textile printing pretreatment liquid according to claim 1,
wherein the ink-jet textile printing ink contains a pigment, a binder resin particle, a water-soluble organic solvent, and water.

8. An ink-jet textile printing method that forms an image in an image-forming area of a textile print target by using the ink set according to claim 7, the method comprising:
a pretreatment process that discharges, by an ink-jetting, the ink-jet textile printing pretreatment liquid to the image-forming area; and
an image formation process that discharges, by an ink-jetting, the ink-jet textile printing ink to the image-forming area.

9. An ink-jet textile printing apparatus that forms an image in an image-forming area of a textile print target by using the ink set according to claim 7, the apparats comprising:
a pretreatment portion that discharges, by an ink-jetting, the ink-jet textile printing pretreatment liquid to the image-forming area; and
an image-forming portion that discharges, by an ink-jetting, the ink-jet textile printing ink to the image-forming area.

10. An ink-jet textile printing pretreatment liquid, comprising:
a specific solvent; and
a specific resin particle,
wherein
the specific solvent contains water and polyvalent alcohol,
the specific resin particle contains a cationic resin having a cationic group, and
a particle size of the specific resin particle is 40 nm or more and 80 nm or less, and
wherein an SP value of the specific solvent is 30 $(J/cm^3)^{1/2}$ or more and 45 $(J/cm^3)^{1/2}$ or less, and an SP value of the cationic resin is 10 $(J/cm^3)^{1/2}$ or more and 20 $(J/cm^3)^{1/2}$ or less.

11. An ink-jet textile printing pretreatment liquid, comprising:
a specific solvent; and
a specific resin particle,
wherein
the specific solvent contains water and polyvalent alcohol,
the specific resin particle contains a cationic resin having a cationic group, and
a particle size of the specific resin particle is 40 nm or more and 80 nm or less, and
wherein difference between an SP value of the specific solvent and an SP value of the cationic resin is 15 $(J/cm^3)^{1/2}$ or more and 25 $(J/cm^3)^{1/2}$ or less.

* * * * *